United States Patent
Bailey et al.

(10) Patent No.: US 9,619,290 B2
(45) Date of Patent: Apr. 11, 2017

(54) HARDWARE AND RUNTIME COORDINATED LOAD BALANCING FOR PARALLEL APPLICATIONS

(71) Applicant: Advanced Micro Devices, Inc., Sunnyvale, CA (US)

(72) Inventors: Peter Bailey, Tucson, AZ (US); Indrani Paul, Round Rock, TX (US); Manish Arora, Dublin, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/641,220

(22) Filed: Mar. 6, 2015

(65) Prior Publication Data
US 2016/0259667 A1  Sep. 8, 2016

(51) Int. Cl.
G06F 9/46 (2006.01)
G06F 9/50 (2006.01)
G06F 9/45 (2006.01)

(52) U.S. Cl.
CPC .............. *G06F 9/505* (2013.01); *G06F 8/443* (2013.01); *G06F 9/5094* (2013.01)

(58) Field of Classification Search
CPC ..................................................... G06F 8/443
USPC .......................... 718/104; 717/150, 153, 160
See application file for complete search history.

(56) References Cited

U.S. PATENT DOCUMENTS

| | | | | | |
|---|---|---|---|---|---|
| 5,317,743 | A | * | 5/1994 | Imai | G06F 8/452 717/160 |
| 5,416,723 | A | * | 5/1995 | Zyl | G08C 19/02 713/300 |
| 6,341,371 | B1 | * | 1/2002 | Tandri | G06F 8/452 712/200 |
| 2003/0005404 | A1 | * | 1/2003 | Bowyer | G06F 17/5045 716/104 |
| 2003/0233648 | A1 | * | 12/2003 | Earl | G06F 8/65 717/176 |
| 2005/0034106 | A1 | * | 2/2005 | Kornerup | G06F 11/323 717/132 |
| 2007/0130568 | A1 | * | 6/2007 | Jung | G06F 8/456 718/104 |
| 2007/0169057 | A1 | * | 7/2007 | Silvera | G06F 8/4452 717/160 |
| 2011/0067014 | A1 | * | 3/2011 | Song | G06F 8/456 717/149 |

(Continued)

OTHER PUBLICATIONS

Deelman et al., "Improving Lookahead in Parallel Discrete Event Simulations of Large-scale Applications using Compiler Analysis", 2001, IEEE.*

(Continued)

*Primary Examiner* — Phillip H Nguyen
(74) *Attorney, Agent, or Firm* — Liang & Cheng, PC

(57) ABSTRACT

A method of balancing execution rates for a plurality of parallel program loops being executed concurrently by a processor may include estimating a completion time for each program loop of the plurality of program loops, determining a difference between the estimated completion time of a first program loop of the plurality of program loops and the estimated completion time of a second program loop of the plurality of program loops, and decreasing the difference by adjusting an execution rate of the first program loop.

20 Claims, 4 Drawing Sheets

(56) References Cited

U.S. PATENT DOCUMENTS

| | | | | |
|---|---|---|---|---|
| 2011/0113224 | A1* | 5/2011 | Isshiki | G06F 11/3419 712/240 |
| 2012/0124351 | A1* | 5/2012 | Egger | G06F 15/7867 712/241 |
| 2012/0151463 | A1* | 6/2012 | Kalogeropulos | G06F 8/458 717/160 |
| 2014/0344793 | A1* | 11/2014 | Lee | G06F 8/452 717/150 |
| 2015/0277874 | A1* | 10/2015 | Haraguchi | G06F 8/443 717/160 |

OTHER PUBLICATIONS

Arnold, Dorian C., et al. "Stack trace analysis for large scale debugging." Parallel and Distributed Processing Symposium, 2007. IPDPS 2007. IEEE International. IEEE, 2007.

Ahn, Dong H., et al. "Scalable temporal order analysis for large scale debugging." High Performance Computing Networking, Storage and Analysis, Proceedings of the Conference on. IEEE, 2009.

Tubella, Jordi, and Antonio Gonzalez. "Control speculation in multithreaded processors through dynamic loop detection." High-Performance Computer Architecture, 1998. Proceedings., 1998 Fourth International Symposium on. IEEE, 1998.

Gordon-Ross, Ann, and Frank Vahid. "Frequent loop detection using efficient nonintrusive on-chip hardware." Computers, IEEE Transactions on 54.10 (2005): 1203-1215.

De Alba, M., and D. Kaeli. "Path-based hardware loop prediction." 4th International Conference on Control, Virtual Instrumentation and Digital Systems. 2002.

Sherwood, Timothy, and Brad Calder. "Loop termination prediction." High Performance Computing. Springer Berlin Heidelberg, 2000.

Li, Jian, Jose F. Martinez, and Michael C. Huang. "The thrifty barrier: Energy-aware synchronization in shared-memory multiprocessors." Software, IEEE Proceedings-. IEEE, 2004.

"Intel® 64 and IA-32 Architectures Software Developer's Manual, vol. 3 (3A, 3B & 3C): System Programming Guide", Order No. 325384-053US. Jan. 2015. 17-1-17-35.

* cited by examiner

HARDWARE AND RUNTIME COORDINATED LOAD BALANCING FOR PARALLEL APPLICATIONS

TECHNICAL FIELD

This disclosure relates to the parallel computing and, in particular, to load balancing of parallel computations.

BACKGROUND

Many modern computing systems are capable of performing parallel computations by executing multiple computations simultaneously. Such computing systems may divide a large computational task into multiple smaller calculations that are solved simultaneously in multiple processing cores. Typically, parallel applications contain both serial and parallel regions, resulting in global barriers following parallel regions, in which multiple parallel threads are executed simultaneously.

A situation where multiple parallel threads complete at different times prior to reaching such a global barrier results in one or more of the threads waiting for the other threads to complete before further processing can continue. This may be due to any of a multitude of factors, including inter-core manufacturing process variation, micro-architectural and scheduling effects, load imbalance inherent to the application, or interference from other applications or the operating system that affects threads unequally.

BRIEF DESCRIPTION OF THE DRAWINGS

The present disclosure is illustrated by way of example, and not by way of limitation, in the figures of the accompanying drawings.

DETAILED DESCRIPTION

Figure 1:
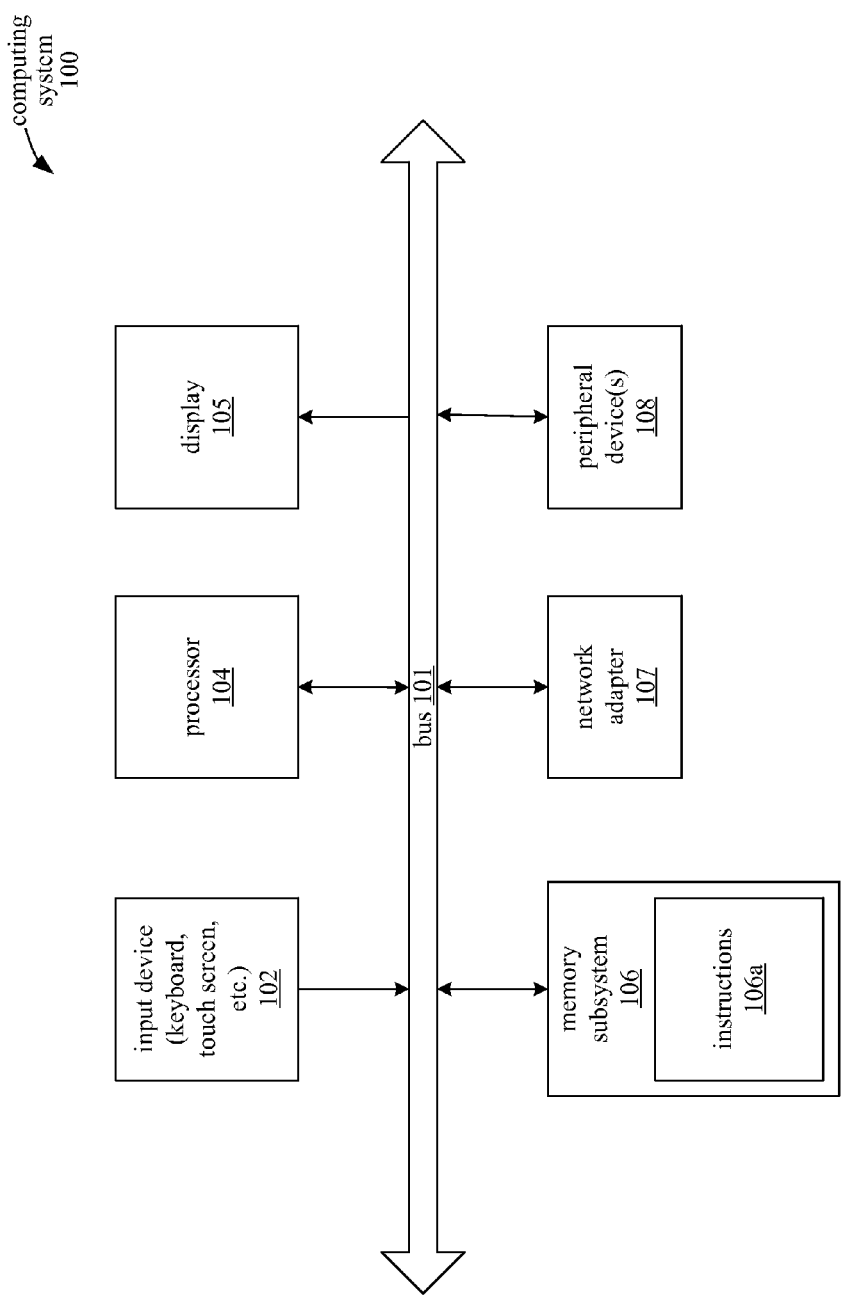
FIG. 1 illustrates an embodiment of a computing system.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

In a parallel computing system where continued execution after a global barrier is delayed until after multiple parallel processing threads have reached the global barrier, optimizing performance of the system may include ensuring that threads that have already reached the global barrier are ready to continue execution when the remaining threads reach the global barrier. In conventional parallel computing systems, the use of power-saving mechanisms may therefore be limited to avoid significant latency incurred by causing the waiting threads to enter and exit sleep states, which could in turn cause delays in continuing execution after all dependent threads have reached the global barrier.

One embodiment of a parallel computing system manages the rate of execution for each of the multiple dependent parallel threads to minimize the differences in the completion times (i.e., arrival times at the global barrier) of the parallel threads. Additionally, such a parallel computing system can also determine whether one or more of the parallel threads can be allowed to enter a sleep state without delaying continued execution of the program after all threads have reached the global barrier. This optimization can be automatically performed by a runtime system that predicts the completion time of the threads based on an analysis of past behavior of the application. Specifically, the parallel computing system may include hardware that gathers parallel loop progress information and automatically (i.e., without input from the compiler, application, or runtime) adjusts the execution rate of one or more of the multiple parallel threads and/or causes one or more of the threads to enter a low power consumption sleep state.

In one embodiment, the runtime system balances the execution rates of the threads to minimize the differences between the completion times of the threads by adjusting the power supplied to the processing cores of a multiprocessor that are executing the parallel threads. Such power balancing could be carried out with the goal of optimizing application performance under a chip-level power constraint. The computing system may also include a mechanism to communicate the parallel loop progress information to the runtime system, enabling the runtime to make these higher-level decisions regarding power and work distribution between cores.

FIG. 1 illustrates an embodiment of a computing system 100 which may implement the parallel thread power management process as described above. In general, the computing system 100 may be embodied as any of a number of different types of devices, including but not limited to a laptop or desktop computer, mobile phone, server, etc. The computing system 100 includes a number of components 102-108 that can communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical casing, such as a laptop or desktop chassis, or a mobile phone casing. In alternative embodiments, some of the components of computing system 100 may be embodied as peripheral devices such that the entire computing system 100 does not reside within a single physical casing.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices that can be used by the computing system 100.

Computing system 100 includes a processor 104 that is configured to receive and execute instructions 106a that are stored in the memory subsystem 106. Memory subsystem 106 includes memory devices used by the computing system 100, such as random-access memory (RAM) modules, read-only memory (ROM) modules, hard disks, and other non-transitory computer-readable media. In one embodiment, the memory subsystem 106 may include logic to implement one or more memory retention controllers each corresponding to a memory region in the memory subsystem 106. The memory subsystem 106 includes instructions 106a that are executable by the processor 104.

Figure 2:
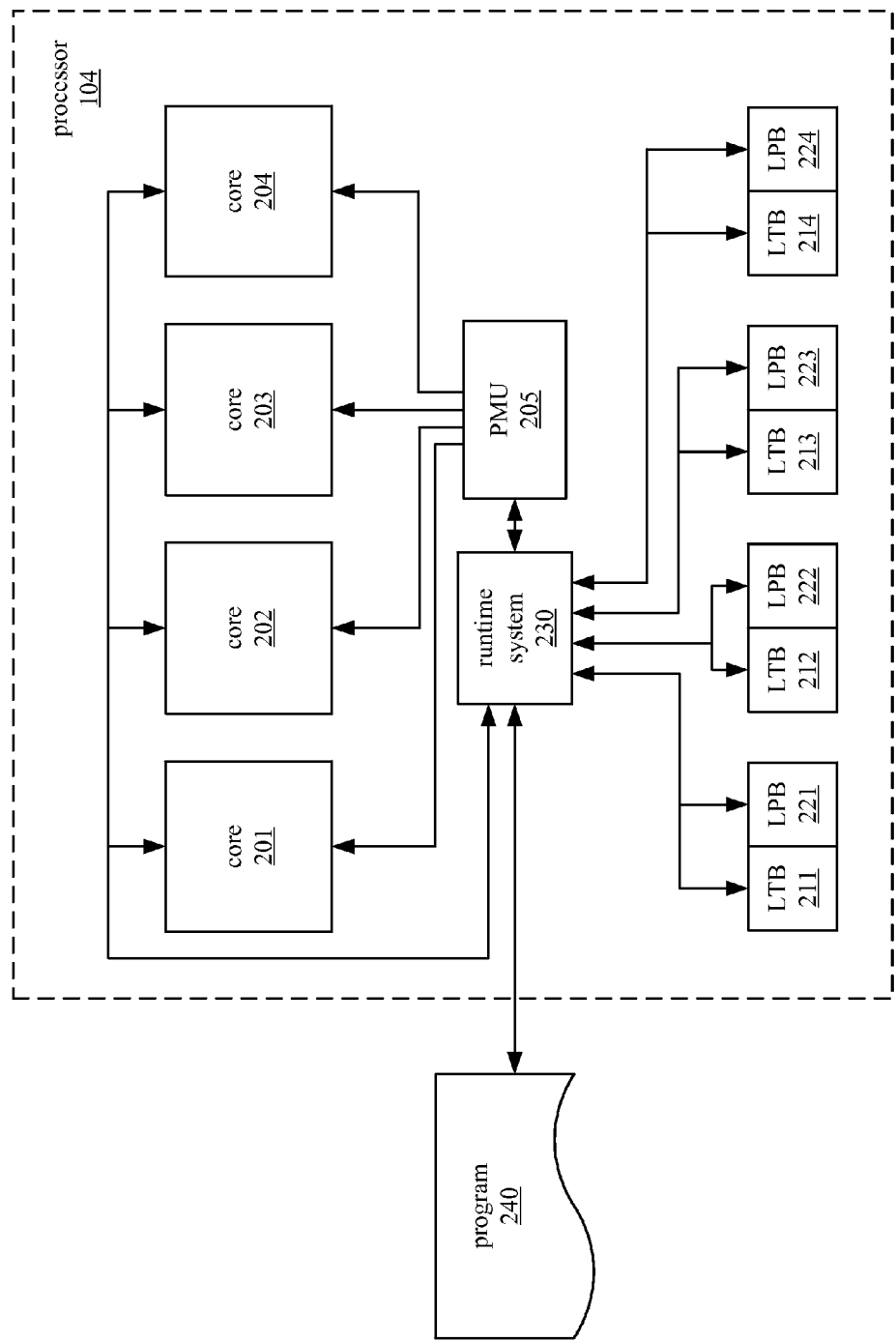
FIG. 2 illustrates an embodiment of a processor implementing loop termination buffers and loop progress buffers.

FIG. 2 illustrates the processor 104 in further detail, according to an embodiment. The processor 104 is a multiprocessor that includes multiple processing cores 201, 202, 203, and 204. In other embodiments, the processor 104 may include fewer or more processing cores. When executing a program 240 having parallel regions, each of the processing cores 201-204 may be assigned to execute one of the multiple parallel threads. Each of the parallel threads may include one or more of the program loops in the program 240.

The processor 104 implements a runtime system 230, which represents the hardware and software resources that manage the execution of the program 240 on the processor 104. FIG. 2 illustrates the runtime system 230 as being included in the processor 104; however, in alternative embodiments, the runtime system 230 may also include hardware and/or software resources that are not located within the processor 104.

The runtime system 230 is coupled with each of the multiple processing cores 201-204 and to the power management unit (PMU) 205 that controls the power supplied to the cores 201-204. The PMU 205 is thus capable of adjusting the execution rate of any of the cores 201-204 and causing any of the cores 201-204 to enter a low power consumption sleep state. Each of the processing cores 201-204 is associated with a loop progress buffer (LPB) and a loop termination buffer (LTB) coupled with the runtime system 230. In processor 104, the processing cores 201, 202, 203, and 204 correspond to loop termination buffers 211, 212, 213, and 214, respectively, and correspond to loop progress buffers 221, 222, 223, and 224, respectively. The LTBs 221-214 and LPBs 221-224 store information about program loops being executed by the processor 104.

During execution of the program 240, the runtime system 230 may manage the execution of multiple program loops of the program 240 in parallel, storing and updating loop progress information about each of these program loops in the LPBs 211-214 and the LTBs 221-224. For each of the program loops, the runtime system 230 predicts an estimated completion time based on the loop progress information associated with that program loop.

For example, execution of the program 240 may result in a first, second, third, and fourth program loops being executed in parallel on respective cores 201, 202, 203, and 204, where continued execution past a global barrier depends on completion of all four program loops. In response to identifying the program loops (e.g., by identifying backwards branching instructions), the runtime system 230 stores and maintains updated loop progress information for each of the loops, and predicts an estimated completion time for each of the loops based on the loop progress information and prior to completion of the program loops.

The runtime system 230 also determines differences between the estimated completion times for the program loops. When multiple parallel program loops are associated with the same global barrier, the runtime system 230 identifies the program loop having the latest estimated completion time. The runtime system 230 then calculates the differences between each of the earlier estimated completion times and the latest completion time by subtraction. For example, the runtime system 230 may subtract a timestamp value representing the estimated completion time of a first program loop from a timestamp value representing the latest estimated completion time, associated with to a second program loop, to obtain a difference value.

For each of the other program loops having an earlier estimated completion time, if the completion time of the program loop differs from (i.e., precedes) the latest estimated completion time by more than a sleep threshold duration, the runtime system 230 causes the processing core assigned to execute the program loop to enter the sleep state. In one embodiment, the duration indicated by the sleep threshold is at least as long as the time to enter the sleep state plus the time to exit the sleep state. For each program loop for which the sleep state is to be initiated, the runtime system 230 commands the power management unit (PMU) 205 to transition the processing core assigned to execute the program loop to a low power consumption sleep state.

Continuing the previous example, if the runtime system 230 predicts that the latest estimated completion time is associated with the fourth program loop, the difference values for the other program loops can be calculated by subtracting their respective estimated completion times from the estimated completion time of the fourth program loop. For each of the program loops associated with a difference value that is greater than the sleep threshold, the runtime system 230 commands the PMU 205 to transition the processing core 201 assigned to execute the program loop to a sleep state after the program loop has completed.

For those processing cores that have been transitioned into a low power consumption sleep state by this process, the runtime system 230 transitions the processing core out of the sleep state prior to the latest estimated completion time. The start of the transition of the processing cores out of the sleep state precedes the latest estimated completion time by a sleep exit threshold, which corresponds to the expected time for the processing core to be ready to execute the next instruction after exiting the sleep state. The processing core can then be ready to continue execution as soon as possible after all dependent program loops have been completed.

When the difference between the estimated completion time of a program loop and the latest estimated completion time is less than the sleep threshold, the runtime system 230 commands the PMU 205 to adjust the execution rates of the program loop in order to decrease the difference between the estimated completion times, with the goal of minimizing this difference. For example, if the fourth program loop executed in core 204 has the latest estimated completion time and the first program loop executed in core 201 has an estimated completion time that precedes the latest estimated completion time of the fourth program loop by less than the sleep threshold duration, then the runtime system 230 commands the PMU 205 to increase the execution rate of the fourth program loop by supplying more power to core 204.

Alternatively, the PMU 205 may reduce the amount of power supplied to core 201 to decrease the execution rate of the first program loop, or the PMU 205 may increase the power to core 204 while simultaneously reducing the power supplied to core 201, thus redistributing power between the cores in order to balance the execution rates of the first and fourth program loops. In one embodiment, the PMU 205 may redistribute power between multiple cores 201-204 in order to adjust the execution rates of the multiple program loops executing on the cores 201-204. The rebalancing of execution rates may be based on estimating the relationship between the power supplied to a processing core and the resulting performance of the processing core; for example, the runtime system 230 may calculate the amount of power to supply to a particular core based on data correlating different power levels to the resulting execution rates for that type of core.

In one embodiment, the runtime system 230 recalculates the estimated completion times for the program loops having adjusted execution rates one or more times during the execution of the program loops, and readjusts the execution rates of the program loops according to the updated estimated completion times. Thus, during the course of the processor 104 executing the multiple parallel threads, if the runtime system 230 detects that one of the parallel threads is outpacing any of the others, the runtime system 230 and PMU 205 can rebalance power between cores to minimize synchronization time at the global barrier for a given power consumption constraint.

Figure 3:
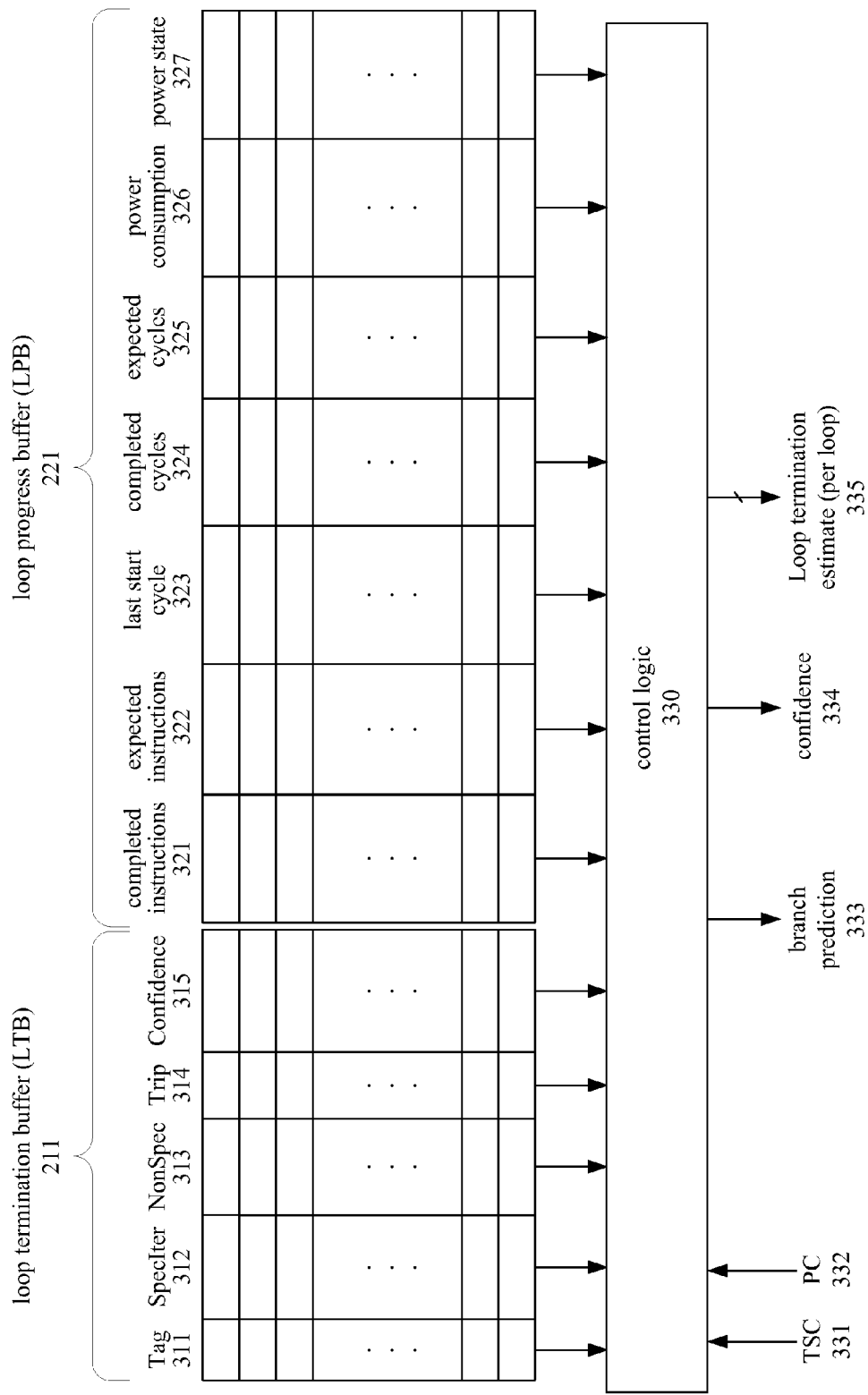
FIG. 3 illustrates a loop termination buffer and a loop progress buffer, according to an embodiment.

FIG. 3 illustrates a loop termination buffer (LTB) 211 and a loop progress buffer (LPB) 221, according to an embodiment. The LTB 211 and the LPB 221 store loop progress information for threads being executed in the processing core 201 and makes the loop progress information available to the runtime system 230. The other LTBs 212-214 and LPBs 222-224 also provide the runtime system 230 with loop progress information for their respective processing cores 202-204. The loop progress information allows the runtime system 230 to predict loop completion times and to adjust the execution rates of the parallel threads or transition one or more of the processing cores executing the parallel threads to low power consumption sleep states. In one embodiment, the LTBs 212-214 and LPBs 222-224 operate according to similar principles as the LTB 211 and LPB 221 described below.

In one embodiment, the LTB 211 is a hardware structure that can store loop termination information for each of a number of program loops of the program 240 that are being executed in the processing core 201. The stored loop termination information includes a tag 311, a speculative iteration count 'SpecIter' 312, a non-speculative iteration count 'NonSpec' 313, a trip count 314, and a confidence bit 315. The tag field 311 stores a program counter of a branch that uniquely identifies the program loop. The fields of the LTB 211 are updated by the runtime system 230 during execution of the program 240.

In one embodiment, the first encounter of a backwards conditional branch in the program 240 (i.e., a branch specifying a negative displacement) causes the runtime system 230 to add the program counter value of the branch to the tag field 331. The program loop is thus added as an entry in the LTB 211, and the remaining fields 312-315 are each initialized to '0'. The fields are then updated based on whether or not the backwards conditional branch is taken and based on comparisons between the fields.

The SpecIter field 312 is used in conjunction with the NonSpec field 313 to track the number of iterations of the program loop (i.e., the number of times the branch has been taken consecutively). A branch misprediction may cause the same loop to be fetched before the original branch resolves as 'not taken'; thus, the SpecIter field 312 is used to count the iterations of the loop executed due to the branch prediction and can be overwritten with the NonSpec 313 value when the original branch resolves and thus determines the branch prediction to be incorrect.

The Trip field 314 stores the number of times the branch was taken before the last instance where the branch was not taken, and can be derived from the iteration counters 312 and 313 when the branch is resolved as 'not taken'. The Confidence bit 315 indicates that the same trip count has been observed at least twice consecutively.

The loop termination information stored in the LTB 211 is used by the runtime system 230 to predict when a program loop that is currently being executed will terminate. For example, a difference between the NonSpec 313 value and the Trip 314 value, when the Confidence bit 315 is asserted, can be used to estimate the number of remaining iterations of the loop to be executed before the loop terminates.

In one embodiment, a loop progress buffer (LPB) 221 extends the LTB 211 and includes additional fields for storing loop progress information, which is updated by the runtime system 230 during execution of the program 240. For each of multiple program loops being executed by the processor 104, the loop progress information may include fields for completed instructions 321, expected instructions 322, a last start cycle field 323, a completed cycles field 324, and an expected total cycle count field 325. The LPB 221 may also be used to track power information for each of the program loops being monitored, such as estimated power consumption 326 for each program loop and the power state 327 for each program loop (e.g., power being supplied to the core assigned to execute the program loop iteration).

The completed instructions field 321 stores the number of instructions that have been completed during execution of a program loop that is currently being executed. The completed instructions field is updated by the runtime system 230, which resets the field 321 to '0' at the start of each program loop, then increments the field 321 for each instruction that is executed until the end of the program loop. In an alternative embodiment, the number of instructions may be calculated or estimated based on other features of the program loop, such as the branch displacement of the loop.

The runtime system 230 may update the expected instructions field 322 based on the final value of the completed instructions field 321 upon reaching the end of the program loop. In one embodiment, the final number of completed instructions 321 for the loop may simply be copied to the expected instructions field 322. Alternatively, the expected instructions 322 field may be updated based on multiple completed instruction count 321 values; for example, the expected instructions 322 may be updated over time to reflect a running average number of completed instructions 321 for the program loop over several iterations.

The runtime system 230 also records a timestamp value indicating the time when the program loop was last entered. This timestamp value is stored in the last start cycle field 323, and may be recorded in response to taking the branch instruction of the program loop.

The completed cycles field 324 stores the number of clock cycles that have elapsed during the current execution of the program loop, while the expected cycles field 325 stores the total number of clock cycles that is expected to have elapsed by the time the program loop has completed execution. The expected cycles value 325 may be calculated based on prior executions of the same program loop. For example, the value stored in the completed cycles field 324 may have been copied to the expected cycles field 325 upon completion of the prior program loop. In one embodiment, the expected cycles value 325 is calculated based on an average of cycle counts for multiple previous executions of the same program loop.

FIG. 3 additionally illustrates a control logic 330, which may be implemented as part of the runtime system 230, according to one embodiment. The control logic 330 uses the loop progress information stored in the LPB 221 and other LPBs 222-224 to monitor program loops in threads being executed on the multiple corresponding processing cores. In one embodiment, the processing cores may be running threads belonging to the same "single program, multiple data" (SPMD) process (e.g. Open Multi-Processing threads).

In one embodiment, the control logic 330 as part of the runtime system 230 is configured to estimate the completion time for each of the monitored program loops based on the loop termination information in the LTB 211 and the loop progress information in the LPB 221. In one embodiment, the control logic 330 assumes regular patterns of loop behavior between successive executions of the program loops in order to predict the behavior of future executions of the program loops. For example, the control logic 330 may estimate the number of remaining loop iterations for a currently executing program loop based on the number of total iterations observed for past executions of the same program loop, or based on an average of the observed total iterations for multiple past executions.

The loop termination estimate output 335 of the control logic 330 indicates the estimated completion time for each of the loops being tracked. In one embodiment, the LTB 211 and LPB 221 include 32 entries, for monitoring up to 32 program loops; accordingly, the loop termination estimate output 335 indicates up to 32 estimated completion times.

The calculation of the estimated completion time for a program loop may account for the number of instructions to be executed for the loop, the number of clock cycles for executing the instructions at a previous power state, and the current power state under which the program loop is being executed. For instance, the control logic 330 may determine the completion time of a program loop by subtracting the completed instructions 321 from the expected instructions 322 for the loop to determine the remaining instructions for the loop, then calculate the remaining clock cycles until the loop completes based on the rate of execution of instructions at the current power state. The control logic 330 can then add the duration corresponding to the remaining clock cycles to the current timestamp TSC 331 to determine the estimated completion time.

In one embodiment, the control logic 330 determines the estimated completion time for a program loop by subtracting the completed cycles value 324 of the loop from the expected cycles value 325 for that loop, to obtain a remaining cycles value. The control logic 330 can then add the duration corresponding to the remaining cycles to the current timestamp TSC 331 to determine the estimated completion time. In one embodiment, the estimated completion time may also be presented in a timestamp format.

Alternatively, the control logic 330 may determine the estimated completion time for the program loop relative to the current program counter value, which may be received by the control logic 330 at the program counter input 332.

The branch prediction output 333 of the control logic 330 indicates whether the next branch is predicted to be taken for the currently executing loop iteration. In one embodiment, the control logic 330 predicts whether the branch will be taken based on the information in the LTB 211. For example, the control logic 330 may predict that the next branch will be taken for each loop iteration until the iteration counters 312 and 313 match the trip field 314 with the confidence bit set.

While the confidence bit 315 indicates a measure of certainty for the Trip value 314, the confidence output 334 of the control logic 330 may indicate a measure of certainty of one or more of the other outputs from the control logic 330, such as the branch prediction output 333 or the loop termination estimate 335. The confidence value 334 may be calculated based on the information in the LTB 211 and the LPB 221, and may also be affected by the accuracy of past predictions determined from this information. In one embodiment, the confidence output value 334 is a single bit; alternatively, the confidence output value 334 may be a larger integer value, or may include multiple values to indicate a level of certainty associated with multiple loop termination estimates or multiple branch predictions.

In some embodiments the control logic 330 or other parts of the runtime system 230 uses the information in the LTB 211 and the LPB 221 to calculate other information about the monitored program loops. For example, the runtime system 230 may identify the program loops that have the greatest number of instructions or cycles, and/or identify the program loops having variable or constant numbers of iterations. The runtime 230 may also determine power consumption information, such as the power efficiency of each of the processing cores 201-204 or may identify program loops that cause the violation of local power constraints.

For each of the processing cores 201-204, the runtime system 230 can control the PMU 205 to adjust the execution rate for the core based on the loop termination estimate 335, the confidence value 334, and other values calculated based on the corresponding LTBs 211-214 and/or LPBs 221-214. For example, the runtime system 230 may use the loop termination information for each of the loops executing on the cores 201-204 to determine which of the cores need to be allocated more or less power to speed or slow the rate of execution. The runtime system 230 then adjusts the execution rates of the cores 201-204 in order to minimize the differences in the completion times of the program loops being executed in parallel.

Figure 4:
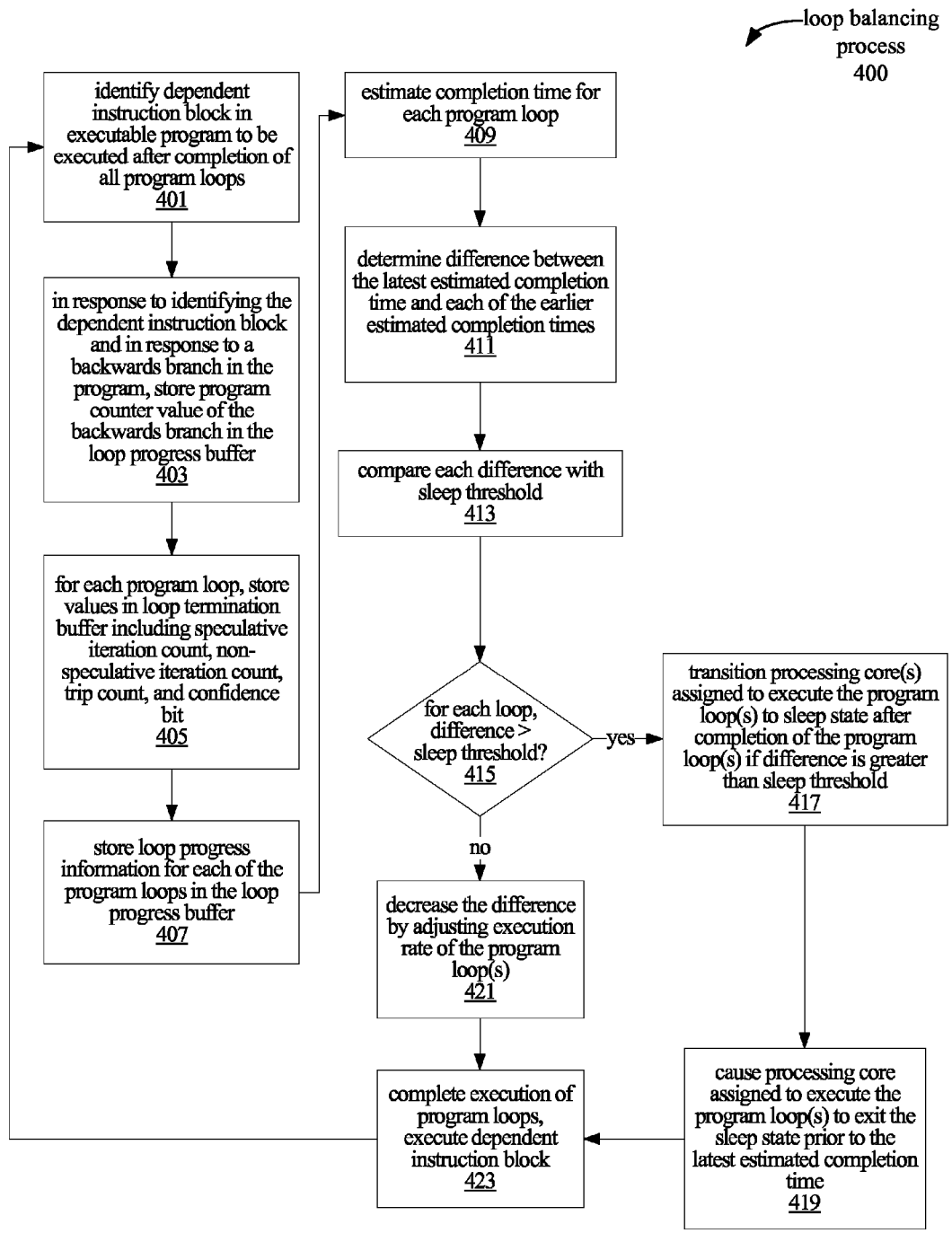
FIG. 4 is a flow diagram illustrating a process for balancing execution rates of parallel program loops, according to an embodiment.

FIG. 4 is a flow diagram illustrating a process 400 for balancing the execution rates of multiple parallel program loops to minimize the differences in their completion times prior to a global barrier, according to an embodiment. The loop balancing process 400 may be executed by the runtime system 230, using the loop termination information and the loop progress information stored in the LTBs 211-214 and the LPBs 221-224, respectively.

Process 400 begins at block 401. At block 401, the runtime system 230 identifies at least one dependent serial instruction block in the program 240 to be executed after the completion of multiple parallel program loops of the program 240. In other words, the execution of the dependent instruction block does not begin until all of the multiple parallel program loops have completed (i.e, a global barrier is reached). From block 401, the process 400 continues at block 403.

At block 403, the runtime system 230 stores a program counter value of a backwards branch in the program in response to encountering the backwards branch in the program 240. In one embodiment, the runtime system 230 stores the program counter value of the backwards branch in the tag 311 field of one of the LTBs 211-214 corresponding to the processing core executing the branch to establish an entry for monitoring the progress of the program loop associated with the branch. For example, the runtime system 230 stores the program counter value of a backwards branch being executed by core 201 in the tag 311 field of the LTB 211, which corresponds to core 201. The other fields 312-315 in the LTB 211 and 321-327 in the LPB 221 comprising the entry are also initialized. From block 403, the process 400 continues at block 405.

At block 405, the runtime system 230 stores loop termination information in the fields 311-315 of the LTB 211. In addition to the program counter of a branch associated with the loop stored in the tag field 311, the loop termination information stored in the LTB 211 also includes the speculative iteration count 312, non-speculative iteration count 313, trip count 314, and confidence bit 315. Loop termination information is similarly stored in the other LTBs 212-214 for loops being executed in the other cores 202-204.

At block 407, the runtime system 230 additionally stores loop progress information for each of the program loops in the LPB 221. In one embodiment, the storing of loop progress information may be performed when one or more dependent instruction blocks has been identified, as provided at block 401. The runtime system 230 similarly stores loop progress information in other LPBs 222-224 for loops being executed in the other cores 202-204. Thus, in one embodiment, the runtime system 230 stores and updates loop progress information in the LPBs 221-224 only for multiple parallel loops that precede a global barrier, while storing and updating loop termination information in the LTBs 211-214 for both parallel and non-parallel loops. Alternatively, the loop progress information may be stored and updated even for non-parallel loops.

In one embodiment, the loop progress information stored in the LPBs 221-224 includes the total number of expected instructions 322, a current number of completed cycles 324, and a number of total expected cycles 325 for each of the monitored program loops. The LPBs 221-224 may additionally store power information, such as the power consumption 326 of the program loop and the power state 327 of the processing core that is executing the loop. From block 407, the process 400 continues at block 409.

At block 409, the runtime system 230 estimates a completion time for each of the parallel program loops preceding the global barrier. The estimated completion time is determined based on the information stored in the LTBs 211-214 and in the LPBs 221-224. From block 409, the process 400 continues at block 411.

At block 411, the runtime system 230 identifies the latest of the estimated completion times, then determines a difference between the latest estimated completion time and each of the earlier estimated completion times. The runtime system 230 can then decrease these differences in the estimated completion times by adjusting the execution rates of the program loops. In one embodiment, adjusting the execution rates includes supplying additional power to cores executing the program loops having later estimated completion times and/or decreasing the amount of power supplied to the cores executing program loops having earlier estimated completion times. For program loops having an estimated completion time that more than a threshold amount earlier than the latest estimated completion time, the adjustment of the execution rate may include transitioning the program loop to a power saving sleep state.

Accordingly, at block 415, the runtime system 230 evaluates each of the calculated differences from block 411 to determine whether the difference is greater than a sleep threshold. In one embodiment, the sleep threshold is a duration value that is greater than or equal to the time for a processing core to enter and then exit the sleep state.

For each program loop corresponding to a difference at block 415 that is not greater than the sleep threshold, the process 400 continues at block 421. At block 421, the runtime system 230 adjusts the execution rate of the program loops by individually adjusting the amount of power supplied to each of the processing cores executing the program loops. For example, the runtime system 230 may increase the power supplied to cores executing loops that have later estimated completion times and/or decrease the power supplied to cores executing loops that have earlier estimated completion times in order to increase or decrease, respectively, the rates of execution for the loops. By these operations, the runtime system 230 minimizes, or at least decreases, the differences between the estimated completion times of all of the program loops.

For each program loop having a difference at block 415 that is greater than the sleep threshold, the process 400 continues at block 417. Thus, each of the program loops for which the process 400 arrives at block 417 is expected to complete with sufficient time to enter and exit the sleep state before the last program loop in the parallel section completes, according to the latest estimated completion time identified at block 411. The runtime system 230 transitions the processing cores assigned to execute these program loops to low power consumption sleep states after completion of their respective program loops. From block 417, the process 400 continues at block 419.

At block 419, the runtime system 230 causes the processing cores that have been transitioned to a sleep state at block 417 to exit their respective sleep states prior to the latest estimated completion time. This allows the cores to be ready to execute the dependent serial instruction block upon completion of the last parallel thread in the parallel section. In one embodiment, each of the processing cores are transitioned out of the sleep state at a time preceding the latest estimated completion time by at least a sleep exit duration. The sleep exit duration represents the duration between the time at which the exit from sleep state is initiated and the time at which the core is ready to execute the next instruction.

In one embodiment, the balancing of power supplied to the processing cores 201-204 as provided at block 421 can be influenced by the number of processing cores that are transitioned to the sleep state at block 417. For example, cores that are placed in the sleep state may correspond to a certain amount of power savings that may be redistributed to the non-sleeping cores. These adjustments may be made according to a predetermined local power constraint or power consumption budget that applies to the processing cores, to the entire chip, or to another grouping of components.

At block 423, the runtime system 230 completes execution of the parallel program loops, then executes the dependent instruction block upon reaching the global barrier. From block 423, the process 400 continues back to block 401. Thus, the process 400 repeats for the next group of parallel threads, which may correspond to the dependent instruction block executed at block 423 or to a subsequent instruction block.

In one embodiment, the runtime system 230 is implemented primarily in hardware (e.g., the processor 104); accordingly, the process 400 is executed primarily by hardware components. Alternatively, some or all of the operations of process 400 may be implemented using software (e.g., implemented in an operating system), or using a combination of software and hardware.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the processor 104 and/or portions thereof carried on the computer-readable storage medium may be a database or other data structure which can be read by a program and used, directly or indirectly, to fabricate the hardware comprising the the processor 104. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the the processor 104. The netlist may then be placed and routed to produce a data set describing geometric shapes to be applied to masks. The masks may then be used in various semiconductor fabrication steps to produce a semiconductor circuit or circuits corresponding to the processor 104. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A method, comprising:
    estimating a completion time for each program loop of a plurality of program loops executed by a processor;
    determining a difference between the estimated completion time of a first program loop of the plurality of program loops and the estimated completion time of a second program loop of the plurality of program loops, wherein the first program loop is executed concurrently with the second program loop; and
    decreasing the difference by adjusting an execution rate of the first program loop.

2. The method of claim 1, further comprising storing loop progress information for each of the plurality of program loops in one or more loop progress buffers, wherein the estimated completion time for each program loop of the plurality of program loops is determined based on the loop progress information.

3. The method of claim 2, wherein the plurality of program loops is defined in an executable program executed by the processor, and wherein the method further comprises:
    identifying a dependent instruction block in the executable program to be executed after completion of all of the program loops of the plurality of program loops; and
    in response to identifying the dependent instruction block and in response to a backwards branch in the program corresponding to the first program loop, storing a program counter value of the backwards branch in the one or more loop progress buffers.

4. The method of claim 2, wherein for each program loop of the plurality of program loops, the loop progress information comprises a number of instructions, a number of completed cycles, and a number of expected total cycles for the program loop.

5. The method of claim 2, wherein for each program loop of the plurality of program loops, the loop progress information comprises a power state of a processing core executing the program loop and an estimated power consumption for the program loop.

6. The method of claim 2, further comprising:
    for each program loop of the plurality of program loops, storing values in one or more loop termination buffers including a speculative iteration count, a non-speculative iteration count, a trip count, and a confidence bit, wherein estimating the completion time is based on the values stored in the one or more loop termination buffers.

7. The method of claim 1, wherein the processor comprises a plurality of processing cores, and wherein adjusting the execution rate of the first program loop comprises adjusting an amount of power supplied to a processing core executing the first program loop.

8. The method of claim 1, further comprising:
    comparing the difference with a sleep threshold; and
    transitioning a processing core assigned to execute the first program loop to a sleep state after completion of the first program loop if the difference is greater than the sleep threshold, wherein the first program loop has an earlier estimated completion time than the second program loop.

9. The method of claim 8, wherein the sleep threshold is longer than a duration for the first program loop to enter the sleep state plus a duration for the first program loop to exit the sleep state.

10. The method of claim 8, further comprising causing the processing core assigned to execute the first program loop to exit the sleep state prior to the estimated completion time of the second loop.

11. An apparatus, comprising:
one or more loop progress buffers configured to store loop progress information for each of a plurality of program loops executed by a set of processing cores;
a runtime system coupled with one or more loop progress buffers and configured to:
estimate a completion time for each of the plurality of program loops based on the loop progress information;
determine a difference between the estimated completion time of a first program loop of the plurality of program loops and the estimated completion time of a second program loop of the plurality of program loops, wherein the first program loop is executed concurrently with the second program loop; and
a power management unit coupled with the runtime system, wherein the power management unit is configured to decrease the difference by adjusting an execution rate of the first program loop.

12. The apparatus of claim 11, wherein the set of processing cores comprises multiple processing cores each configured to execute one of the plurality of program loops.

13. The apparatus of claim 12, wherein the power management unit is further configured to adjust the execution rate of the first program loop by redistributing power between two or more of the multiple processing cores.

14. The apparatus of claim 12, wherein the power management unit is further configured to cause at least one of the multiple cores to enter a sleep state based on the difference between the estimated completion time of the first program loop and the estimated completion time of the second program loop.

15. The apparatus of claim 11, wherein for each program loop of the plurality of program loops, the loop progress information comprises a number of instructions, a number of completed cycles, and a number of expected total cycles, a power state of a processing core executing the program loop, and an estimated power consumption for the program loop.

16. The apparatus of claim 11, further comprising one or more loop termination buffers coupled with the runtime system, wherein the one or more loop termination buffers are configured to, for each of the plurality of program loops, store loop termination information comprising a speculative iteration count, a non-speculative iteration count, a trip count, and a confidence bit, wherein the runtime system is further configured to estimate the completion time based on the loop termination information.

17. A non-transitory computer-readable medium storing instructions that when executed by a processor, cause the processor to perform a method comprising:
estimating a completion time for each program loop of a plurality of program loops executed by the processor;
determining a difference between the estimated completion time of a first program loop of the plurality of program loops and the estimated completion time of a second program loop of the plurality of program loops, wherein the first program loop is executed concurrently with the second program loop; and
decreasing the difference by adjusting an execution rate of the first program loop.

18. The non-transitory computer-readable medium of claim 17, wherein the method further comprises storing loop progress information for each of the plurality of program loops in one or more loop progress buffers, wherein the estimated completion time for each program loop of the plurality of program loops is determined based on the loop progress information.

19. The non-transitory computer-readable medium of claim 17, wherein the processor comprises a plurality of processing cores, and wherein adjusting the execution rate of the first program loop comprises adjusting an amount of power supplied to a processing core executing the first program loop.

20. The non-transitory computer-readable medium of claim 17, wherein the method further comprises:
comparing the difference with a sleep threshold; and
transitioning a processing core assigned to execute the first program loop to a sleep state after completion of the first program loop if the difference is greater than the sleep threshold, wherein the first program loop has an earlier estimated completion time than the second program loop.

* * * * *